US008520276B2

(12) United States Patent
Dalal et al.

(10) Patent No.: US 8,520,276 B2
(45) Date of Patent: Aug. 27, 2013

(54) COLOR MANAGEMENT FOR SELECTABLE GLOSS APPLICATIONS

(75) Inventors: Edul N. Dalal, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 306 days.

(21) Appl. No.: 13/116,233

(22) Filed: May 26, 2011

(65) Prior Publication Data

US 2012/0300230 A1   Nov. 29, 2012

(51) Int. Cl.
*H04N 1/60* (2006.01)

(52) U.S. Cl.
USPC .......................................... 358/518; 358/504

(58) Field of Classification Search
USPC .......... 358/1.9, 504, 518, 530, 300; 382/162, 382/167; 347/115; 399/67, 321, 341; 430/33, 430/45.53, 117.5, 124.1
See application file for complete search history.

(56) References Cited

U.S. PATENT DOCUMENTS

| | | | |
|---|---|---|---|
| 5,413,888 | A | 5/1995 | Sacripante et al. |
| 6,032,004 | A | 2/2000 | Mirabella, Jr. et al. |
| 7,324,240 | B2 | 1/2008 | Ng |
| 7,986,438 | B2 * | 7/2011 | Takahashi et al. ............. 358/1.9 |
| 2006/0187505 | A1 | 8/2006 | Ng et al. |
| 2007/0273920 | A1 | 11/2007 | Galmes et al. |
| 2009/0219554 | A1 | 9/2009 | Freyer et al. |
| 2009/0284812 | A1 | 11/2009 | Tsukamoto |
| 2009/0286177 | A1 | 11/2009 | Tyagi et al. |
| 2010/0226701 | A1 | 9/2010 | Moorlag |
| 2012/0320393 | A1 * | 12/2012 | Ito .................................. 358/1.9 |

FOREIGN PATENT DOCUMENTS

JP   2007124242   5/2007

OTHER PUBLICATIONS

E. N. Dalal and K. M. Natale-Hoffman, "The Effect of Gloss on Color", Color Res. & Application, vol. 24, pp. 369-376 (1999).
P. C. Swanton and E. N. Dalal, "Customer Gloss Preferences for Color Xerographic Images," Xerox Internal Report X9400001 (1994). P. C. Swanton and E. N. Dalal, J. Imaging Sci. & Tech., vol. 40, pp. 158-163 (1996).
U.S. Appl. No. 12/907,431, filed Oct. 19, 2010; Matthew M. Kelly et al; Variable Gloss Fuser Coating Material Comprised of a Polymer Matrix With the Addition of Alumina Nano Fibers.
U.S. Appl. No. 13/053,730, filed Mar. 22, 2011; Edward G. Zwartz et al; Tunable Gloss Using Aerogel Ceramic Fillers Added to Viton Coatings for Fusing Applications.
U.S. Appl. No. 13/053,418, filed Mar. 22, 2011; Carolyn Moorlag et al; Surface Coating and Fuser Member.

(Continued)

*Primary Examiner* — Scott A Rogers
(74) *Attorney, Agent, or Firm* — Gibb & Riley, LLC

(57) ABSTRACT

Methods and systems are disclosed which are capable of efficiently performing color management of a variable gloss color printing system. The methods and systems select at least one set of the linear color values corresponding to the color profile for the printing device (at the nominal gloss condition). The linear color values selected comprise those obtained from color values corresponding to each node of the color profile at the nominal gloss condition. In a colorimetric embodiment, the linear color values can comprise: tristimulus values XYZ; red, green, blue (RGB); or luminance component Y, and two chromatic components C1 and C2 (YCC). In a reflectance embodiment, the linear color values comprise reflectance spectra. This exemplary method adds an offset term to each of the linear color values to produce a corresponding set of modified linear color values, and generates a color profile for the printing device at the desired gloss condition based on the modified linear color values.

26 Claims, 8 Drawing Sheets

(56) References Cited

OTHER PUBLICATIONS

U.S. Appl. No. 13/053,423, filed Mar. 22, 2011; Carolyn Moorlag et al; Method of Controlling Gloss.

U.S. Appl. No. 12/709,690, filed Feb. 22, 2010; Edward G. Zwartz et al; Tunable Gloss Toners.

U.S. Appl. No. 12/709,680, filed Feb. 22, 2010; Edward G. Zwartz et al; Electrophotographic Apparatus.

* cited by examiner

|  | $\Delta E_{00}$ between 2 repeats of the prints | | | | |
|---|---|---|---|---|---|
|  | CE | CG | DG | DS | KK |
| RMS | 0.78 | 0.77 | 1.03 | 0.98 | 1.03 |
| Ave. | 0.62 | 0.64 | 0.87 | 0.80 | 0.81 |
| P95 | 1.53 | 1.42 | 1.88 | 1.94 | 2.10 |
| Max | 4.57 | 2.66 | 4.39 | 3.88 | 4.90 |

*FIG. 3*

|  | $\Delta E_{00}$ between ave. measurement and its 1-basis PCA approximation | | | | |
|---|---|---|---|---|---|
|  | CE | CG | DG | DS | KK |
| RMS | 1.02 | 0.51 | 0.57 | 0.60 | 0.82 |
| Ave. | 0.75 | 0.39 | 0.44 | 0.46 | 0.62 |
| P95 | 2.18 | 1.03 | 1.12 | 1.20 | 1.69 |
| Max | 4.64 | 2.41 | 2.66 | 2.85 | 3.52 |

*FIG. 4*

COLOR MANAGEMENT FOR SELECTABLE GLOSS APPLICATIONS

BACKGROUND

Embodiments herein generally relate to printers having variable gloss capability and more particularly to methods and systems that update color profiles from color measurements under a small subset of gloss settings.

Customer gloss preferences vary significantly, depending primarily on the printing application. High gloss provides high chroma and therefore large color gamut, making high gloss very desirable for some applications. On the other hand, high gloss makes defects (such as gloss mottle) and non-uniformity (such as differential gloss) readily apparent, making high gloss very undesirable for some applications. Moreover, the preferred image gloss is often dependent on the paper used and on the image content of a particular print job. For these reasons, a printing system that delivers only a single gloss level has to make some compromises and is unlikely to be able to satisfy all customers for all applications. Consequently, selectable gloss capability is very desirable, especially with digital printing now becoming capable of very high quality. However, color management of such systems poses some challenges because gloss has a very significant effect on color. Therefore, when the gloss level is changed, the color rendition of the device will change, and it is necessary to rebuild the printer's destination profiles every time the gloss is changed, which is time and resource intensive.

SUMMARY

In view of these issues, computer-implemented methods and systems that generate a color profile for a printing device at any desired gloss condition that is achievable on the printing device are presented herein. One exemplary method performs at least one test print at a nominal gloss condition. Here, gloss condition is the state of the printer subsystems (such as the fuser) which determine the gloss of the prints. The gloss condition can be quantified, for example, by using the measured gloss values of one or more defined colors. It is conventional to use the average of the 100% separations C, M, Y, and K. Nominal gloss condition is a pre-defined gloss condition. It may be defined, for example, as that gloss condition of the printer which produces pre-defined gloss values of the one or more defined colors. This method performs color measurements on the test print to generate a color profile and to obtain linear color values. Linear color values are color descriptors which are linearly related to the reflectance spectrum. As used in this document, the term includes tristimulus values XYZ, RGB, YCC, etc., in addition to the reflectance spectrum itself.

This method selects at least one set of the linear color values corresponding to the color profile for the printing device (at the nominal gloss condition) using at least one computerized device operatively connected to (directly or indirectly connected to) the printing device. The linear color values selected comprise those obtained from color values corresponding to each node of the color profile at the nominal gloss condition. In a colorimetric embodiment, the linear color values can comprise: tristimulus values XYZ; red, green, blue (RGB); or luminance component Y, and two chromatic components C1 and C2 (YCC). In a reflectance embodiment, the linear color values comprise reflectance spectra. This exemplary method adds an offset term to each of the linear color values to produce a corresponding set of modified linear color values, and generates a color profile for the printing device at the desired gloss condition based on the modified linear color values. The offset term comprises a function of the desired gloss condition (the function can be determined empirically). For example, the function can be based on a Principal Component Analysis (PCA) of color data as a function of gloss condition.

Also, the offset term can comprise a function of the desired gloss condition and a corresponding color that corresponds to a linear color value. The corresponding color corresponds in terms of input colorant values (which can be, for example, in terms of cyan, magenta, yellow, and black (CMYK) values). The function can be based on a Principal Component Analysis (PCA) of color data as a function of gloss condition.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 3 is a table of fitting errors, illustrating aspects of embodiments herein;

FIG. 4 is a table of fitting errors, illustrating aspects of embodiments herein;

DETAILED DESCRIPTION

As mentioned above, it is necessary to rebuild a printer's destination profiles every time the gloss is changed, which is time and resource intensive. In view of this, embodiments described below efficiently perform color management in a marking engine that has a selectable gloss capability. Wide ranges of gloss can be achieved by varying fuser parameters such as temperature, nip width, roll pressure, etc. When the gloss level is changed, the color rendition of the device will change because gloss has a very significant effect on color.

Alternatively, it is possible to generate a large number of destination profiles, one for each gloss condition, and then use the appropriate profile when the gloss level is changed. However, every time the printer needs to be re-profiled, all of these many conditions also need to be re-profiled, which again is time and resource intensive and impractical.

The embodiments herein present a different approach and compute the appropriate destination profiles for all the gloss levels based on profiles actually generated at only a few gloss levels. The time and effort involved in implementing the embodiments herein is significantly less than is required in the conventional methods, where color profiling would be performed every time the gloss is changed.

More specifically, with such conventional methods, many hundreds or even thousands of color patches have to be printed and measured for generating each destination profile. The standard IT8.7/4 test pattern according to the NPES Standards Blue Book commonly used for profiling has 1617 patches. Consequently, the conventional approaches can be very impractical to implement if the gloss is changed reasonably frequently, whereas a significant reduction in effort is provided by the embodiments herein which make the process much less time and resource intensive, and quite practically feasible. A secondary benefit of the embodiments herein is that noise, inherent in the printing and measurement of the color patches, is smoothed out by the embodiments herein, so better color management is provided.

Figure 1:
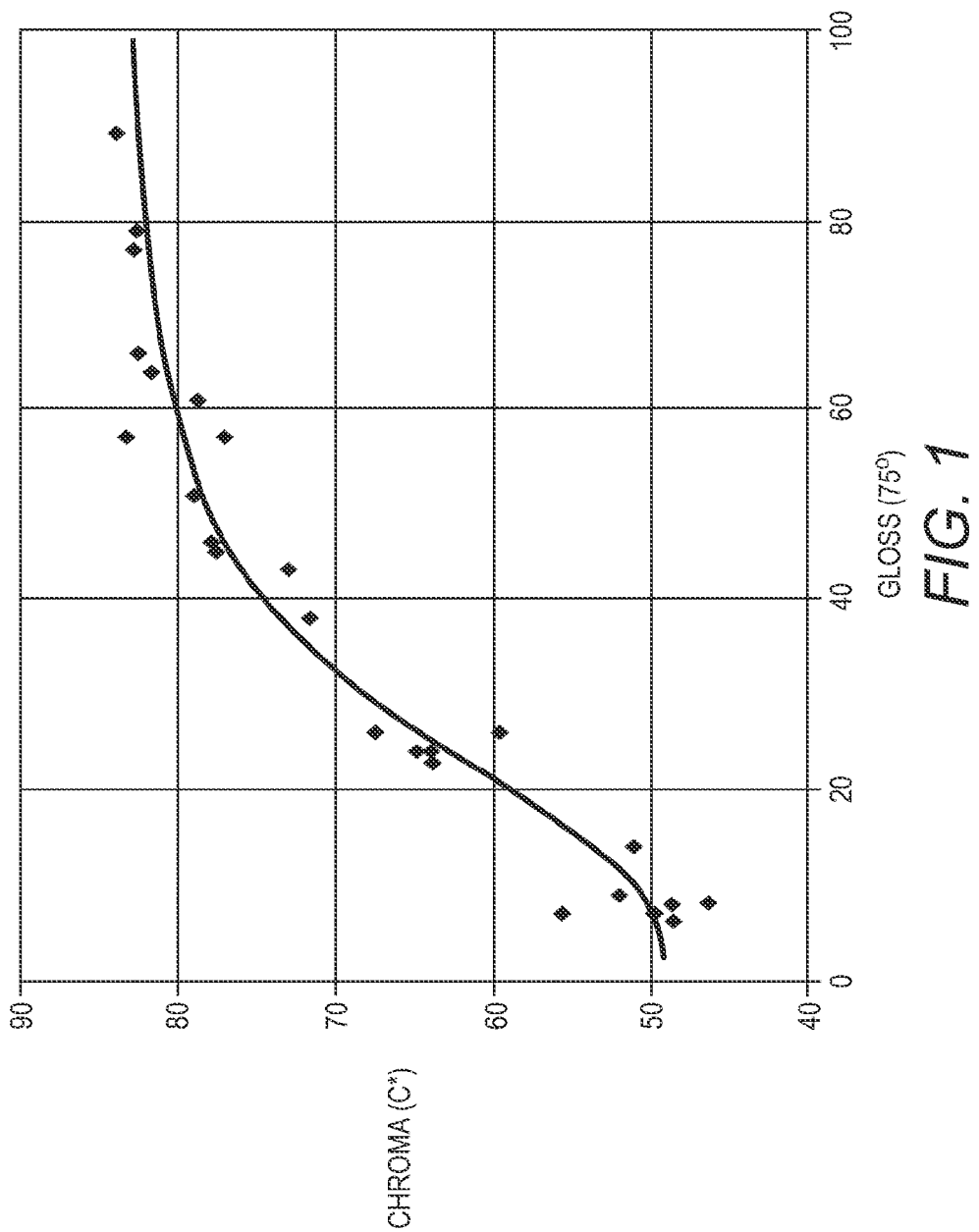
FIG. 1 is a graph of chroma verses gloss, illustrating aspects of embodiments herein.
Figure 2:
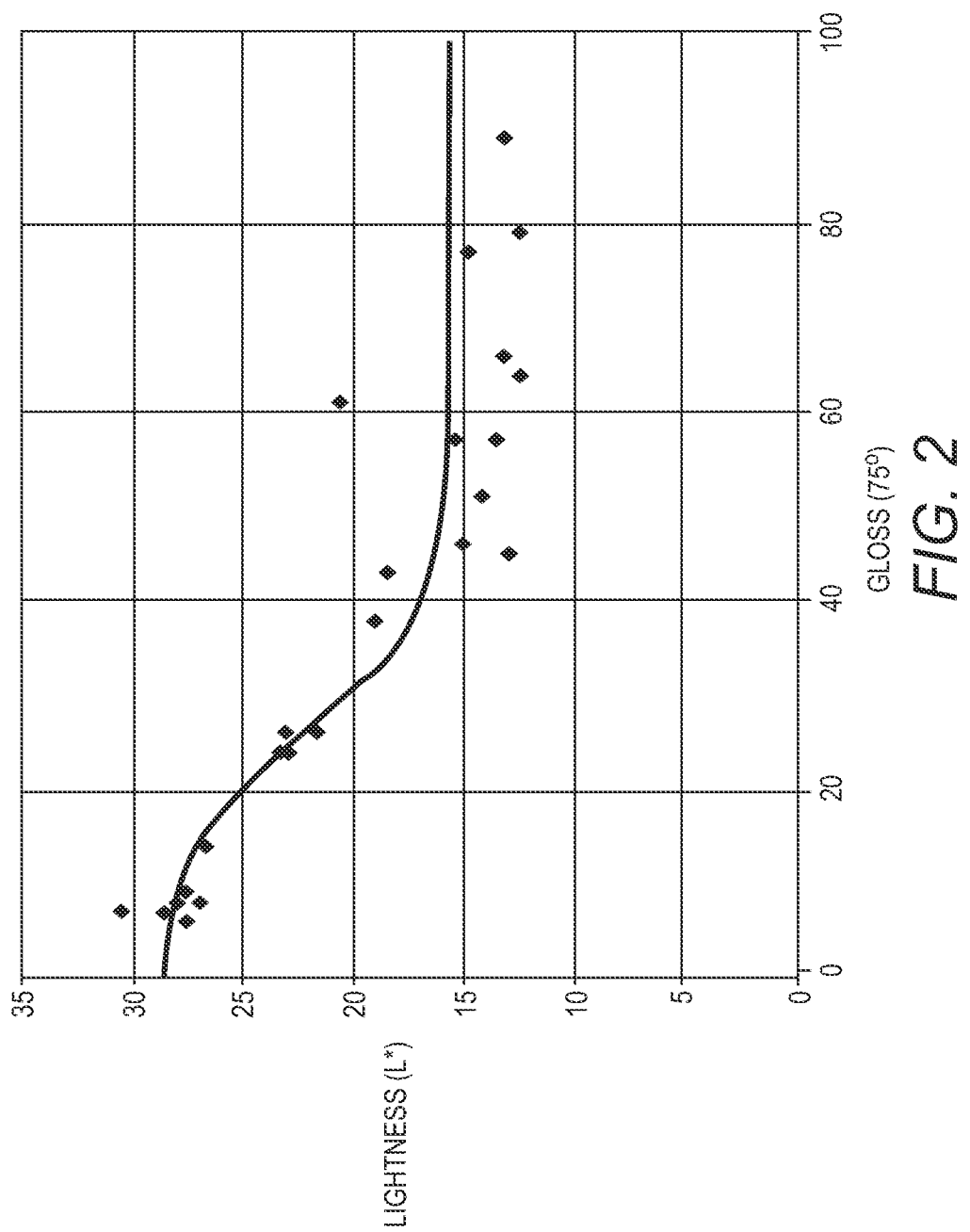
FIG. 2 is a graph of lightness verses gloss, illustrating aspects of embodiments herein.

The embodiments herein take advantage of the fact that the effect of gloss on color is predictable, and can be modeled with a few experimental parameters. The basic idea is that some of the incident light is reflected off the front surface of the print sample. This surface-reflected light is substantially white light, and its magnitude is approximately independent of the gloss. However, the direction of the surface-reflected light is very dependent on the gloss, being fairly diffuse at low gloss and quite specular at high gloss. Consequently, the diffuse light involved in the perception of color is almost independent of the white surface-reflected light at very high gloss. However, the diffuse light is "diluted" with increasing amounts of white surface-reflected light as the gloss is reduced. As a result, the perceived chroma (C*) of the print sample decreases as the gloss is reduced, while the perceived lightness (L*) increases. The hue is fairly independent of gloss. Dark chromatic colors are most affected by gloss. This effect can be very large, as shown in FIG. 1. More specifically, FIG. 1 illustrates the effect of gloss on chroma of a blue print and FIG. 2 illustrates the effect of gloss on lightness of a blue print (data taken from E. N. Dalai and K. M. Natale-Hoffman, *Color Res. & App.*, Vol 24, pp. 369-376 (1999), herein referred to as "Dalal").

The embodiments herein can be applied in many different ways. One exemplary embodiment is used with colorimetric data (e.g., CIE L*a*b*) and another is used with spectral data (e.g., reflectance). L*a*b* space is a color-opponent space with dimension L* for lightness and a* and b* for the color-opponent dimensions, based on nonlinear functions of the CIE (International Commission on Illumination) XYZ color space coordinates.

Most profiling methods use colorimetric data only, but some partially or completely use spectral data. For profiling methods that use spectral data, the reflectance embodiment described below can be used. For profiling methods that use colorimetric data, the colorimetric embodiment may be used directly, or the reflectance embodiment may be used on the measured spectral data which is then converted to colorimetric data using standard CIE calculations.

With respect to the colorimetric data embodiment, CIE L*a*b* space is a non-linear function of reflectance, so it is not an appropriate space for applying the gloss model. If the colorimetric data is available as L*a*b*, it should first be converted to tristimulus values XYZ, using the standard CIE formulas.

As determined in Dalai, the effect of gloss on color can be described by the following equations:

$$X(c,g) = X_i(c) + r(g) \cdot X_n \quad (1)$$

$$Y(c,g) = Y_i(c) + r(g) \cdot Y_n \quad (2)$$

$$Z(c,g) = Z_i(c) + r(g) \cdot Z_n \quad (3)$$

where $X(g)$, $Y(g)$, $Z(g)$ are the tristimulus values of a given color c at a gloss value of g, and $X_i(c)$, $Y_i(c)$, $Z_i(c)$ are the "intrinsic" tristimulus values for that color. $r(g)$ is the captured portion of the front surface reflected light, and $X_n$, $Y_n$, $Z_n$ are the tristimulus values of the reference white (in effect, the tristimulus values of the illuminant).

$X_n$, $Y_n$, $Z_n$ are constant values, $X_i(c)$, $Y_i(c)$, $Z_i(c)$ are functions of the given color but independent of gloss g, and $r(g)$ is a function of gloss but independent of the given color. In practice, it is advantageous to use the tristimulus values at some nominal gloss condition, instead of the intrinsic tristimulus values. Also, while these parameters can be calculated from first principles, it is advantageous to treat them as experimentally determined parameters. Moreover, a better fit to experimental data can generally be obtained by replacing the term $r(g)$ by $r(c,g)$, a function of color as well as gloss.

After the effect of gloss is calculated in XYZ space, the results can be reconverted to L*a*b* space using standard CIE formulas.

With respect to the spectral data embodiment, similar to the colorimetric embodiment, the effect of gloss on the reflectance spectrum can be described by the following equation:

$$R(\lambda,c,g) = R_{i(\lambda,c)} + r(g) \cdot R_n(\lambda) \quad (4)$$

where $R(\lambda, c, g)$ is the reflectance factor at a wavelength $\lambda$ of a given color c at a gloss value of g, and $R(\lambda, c)$ is the reflectance factor at a wavelength $\lambda$ for that color. $r(g)$ is the captured portion of the front surface reflected light, and $R_n(\lambda)$ is the reflectance factor at a wavelength $\lambda$ of the reference white.

$R_n(\lambda)$ is a constant spectrum independent of gloss or color, $R_i(\lambda, c)$ is a function of the given color but independent of gloss g, and $r(g)$ is a function of gloss but independent of the given color. While these parameters can be calculated from first principles, it is advantageous to treat them as experimentally determined parameters.

The experimental data at any given gloss value g consists of one measured reflectance spectrum $R(\lambda, c, g)$ for each color c in the test pattern. For example, if the standard IT8.7/4 test pattern is used for profiling, there are 1617 colors and therefore that many spectra. This will be repeated for each gloss level g.

In practice, it is convenient to fit the parameters to the data numerically using a PCA (Principal Component Analysis) approach. This may be done for one color at a time, as a function of gloss. In this case, the PCA coefficients describe the effect of gloss; and the PCA first basis vector approximates the reflectance factor $R_n(\lambda)$.

The PCA coefficients should smoothly and monotonically change with gloss, and should asymptote at high gloss. However, there is always experimental noise in the color patch measurement, partly due to measurement error but largely due to printer variability. Consequently, although the PCA fitting inherently provides some smoothing of the data, it can be beneficial to further smooth the PCA coefficients, preferably with an asymptotic function such as a Logistic Dose Response function. As shown in the next section (FIG. 7, discussed below) a small amount of smoothing may be sufficient. A further benefit of fitting to the asymptotic function is that the asymptotic function is known for each color after the first full characterization of the system, e.g., at the manufacturing site. When the characterization needs to be repeated in the field (e.g., due to printer drift) it is enough to perform the characterization with as few as a single gloss condition, the other conditions being determined from the pre-determined asymptotic function.

There are some further issues to be resolved in applying this method in the color management of a selectable gloss color printing system. In practice, the gloss of the printing system is typically represented by some ensemble gloss value, e.g., the average gloss of the 100% C, M, Y, K patches.

However, the gloss of different colors (i.e., different CMYK combinations) can be different. It is generally not practically feasible to measure the gloss of all the hundreds of color patches, at each of the different gloss conditions, and to use all of them in a model, so the embodiments herein utilize ways of dealing with this issue:

Method (A): Use an ensemble value for gloss, such as the gloss of the 100% separations. This deviates from the physical model (Dalai) but this can be compensated for by using a fitting model which has more degrees of freedom. The PCA model uses a first-basis vector $R_1(\lambda,c)$ which varies by wavelength and by color, in contrast with the constant scalar value $R_n(g)$ in the physical model.

Method (B): Use a halftone gloss model to estimate the gloss of each CMYK combination, and use this color-specific gloss value instead of an ensemble value such as the gloss of the 100% separations.

An example of the spectral data embodiment, implemented using data from an internal gloss study, is shown in FIGS. 3-4. The samples, with 6 gloss levels covering a wide range and 2 repeats for each condition, were generated by printing on a Xerox DC700 and fusing offline under different fusing conditions. Color measurements were made on a specific 561-patch test pattern.

Spectral measurements from these print samples were averaged (average of 2 repeats) separately for each of the 561 test colors printed on five different substrates. The averaged reflectance spectra were subjected to PCA analysis limited to 2 basis vectors for each color: a mean spectrum and a first-basis spectrum. There was one PCA coefficient at each of the 6 gloss levels.

$$R(\lambda,c,g) = R_0(\lambda,c) - a(g) \cdot R_1(\lambda,c) \quad (5)$$

where $R(\lambda, c, g)$ is the reflectance factor at a wavelength $\lambda$ of a given color c at a gloss value of g, and the basis vectors for each color are $R_0(\lambda, c)$ (mean) and $R_1(\lambda, c)$ (first basis vector). $a(g)$ is the corresponding PCA coefficient for the first basis vector at the gloss level g.

In order to determine repeatability errors (due primarily to printer variability, but also including measurement noise, etc.), the color difference between the two repeat samples for each of the 561 test colors printed on five different substrates were calculated. Table 1 in FIG. 3 shows the calculated repeatability errors.

The 2-basis PCA estimation used in the embodiments herein inherently provides some smoothing of the data. This smoothing is beneficial, but if excessive smoothing is applied large fitting errors can result. The PCA model fitting errors were calculated as the difference between the fitted values and the actual measurement data. Table 2 in FIG. 4 shows the calculated repeatability errors.

Comparison of the repeatability errors in Table 1 (FIG. 3) and the PCA fitting errors in Table 2 (FIG. 4) indicates that the PCA fitting errors are almost the same as the repeatability errors, indicating that there is very little loss of accuracy on applying this procedure. The PCA fitting errors can be further reduced, if desired, by including additional PCA basis vectors (second basis, third basis, etc.). However, this has the risk of being less robust to noise, and moreover deviates from the physical model (Dalal). Therefore, given that the fitting error was small, the method limited the PCA to the first basis vector, but additional basis vectors can be used when it is necessary to minimize fitting error.

Figure 5:
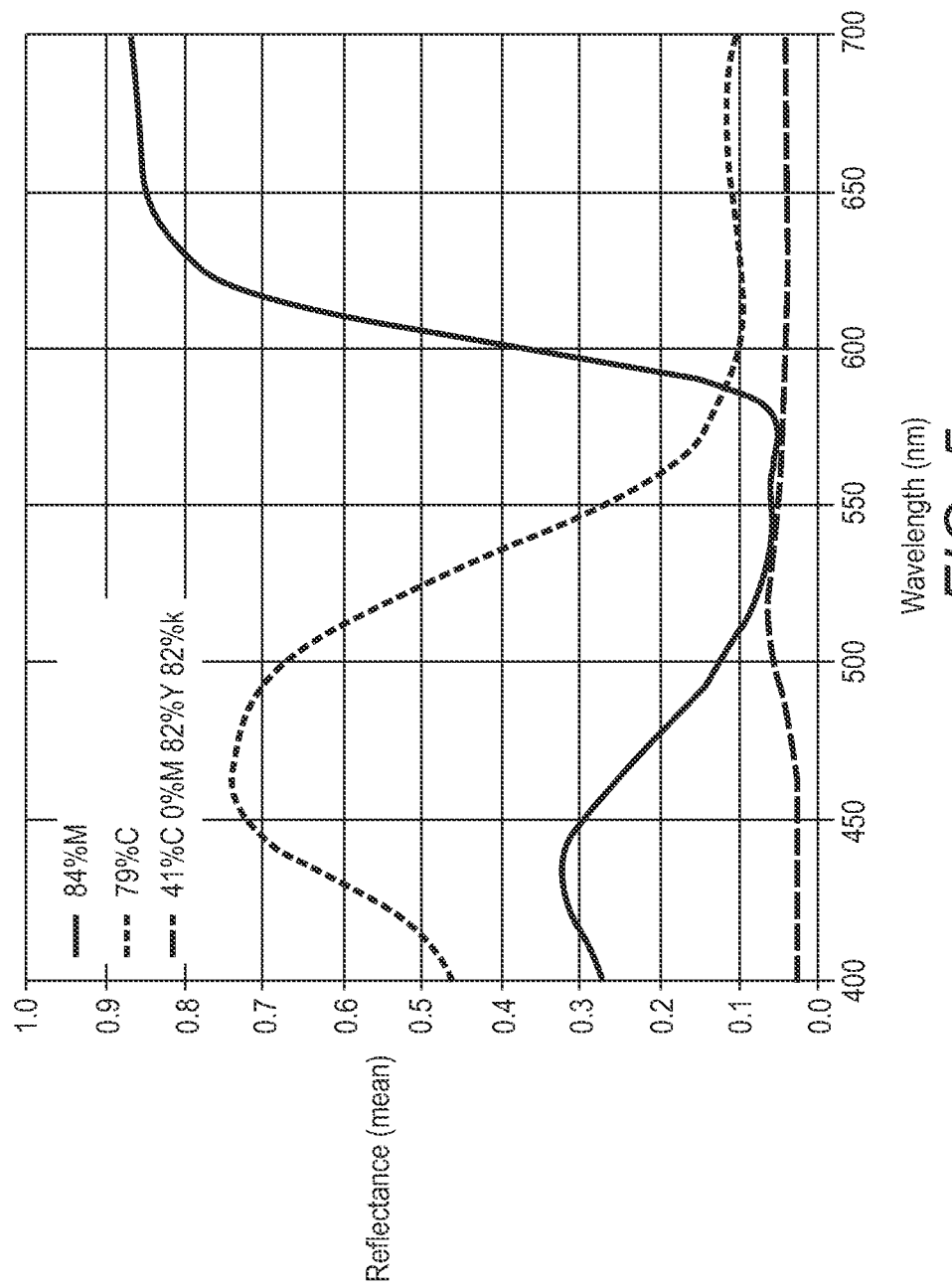
FIG. 5 is a graph of reflectance verses wavelength, illustrating aspects of embodiments herein.
Figure 6:
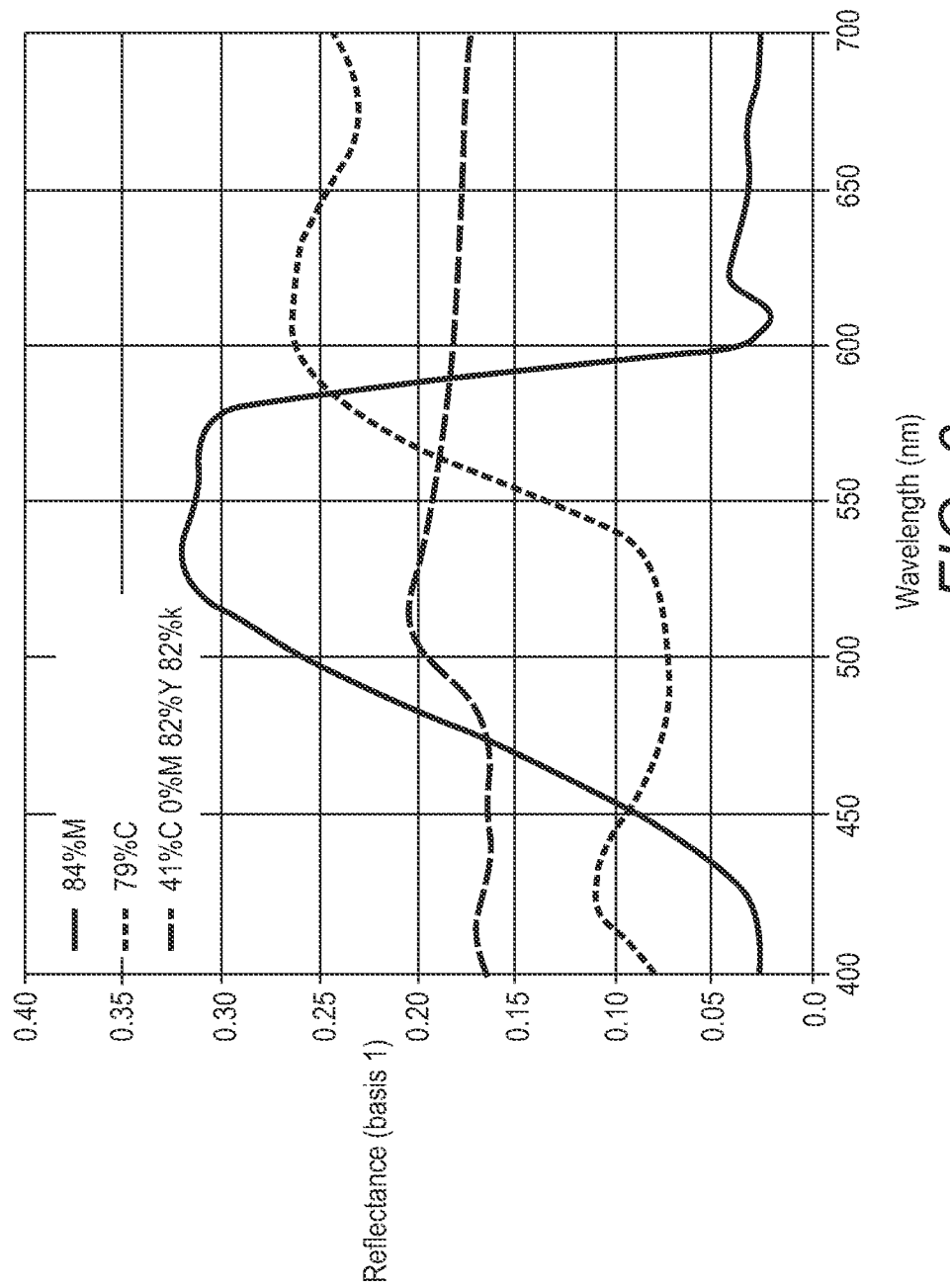
FIG. 6 is a graph of reflectance verses wavelength, illustrating aspects of embodiments herein.
Figure 7:
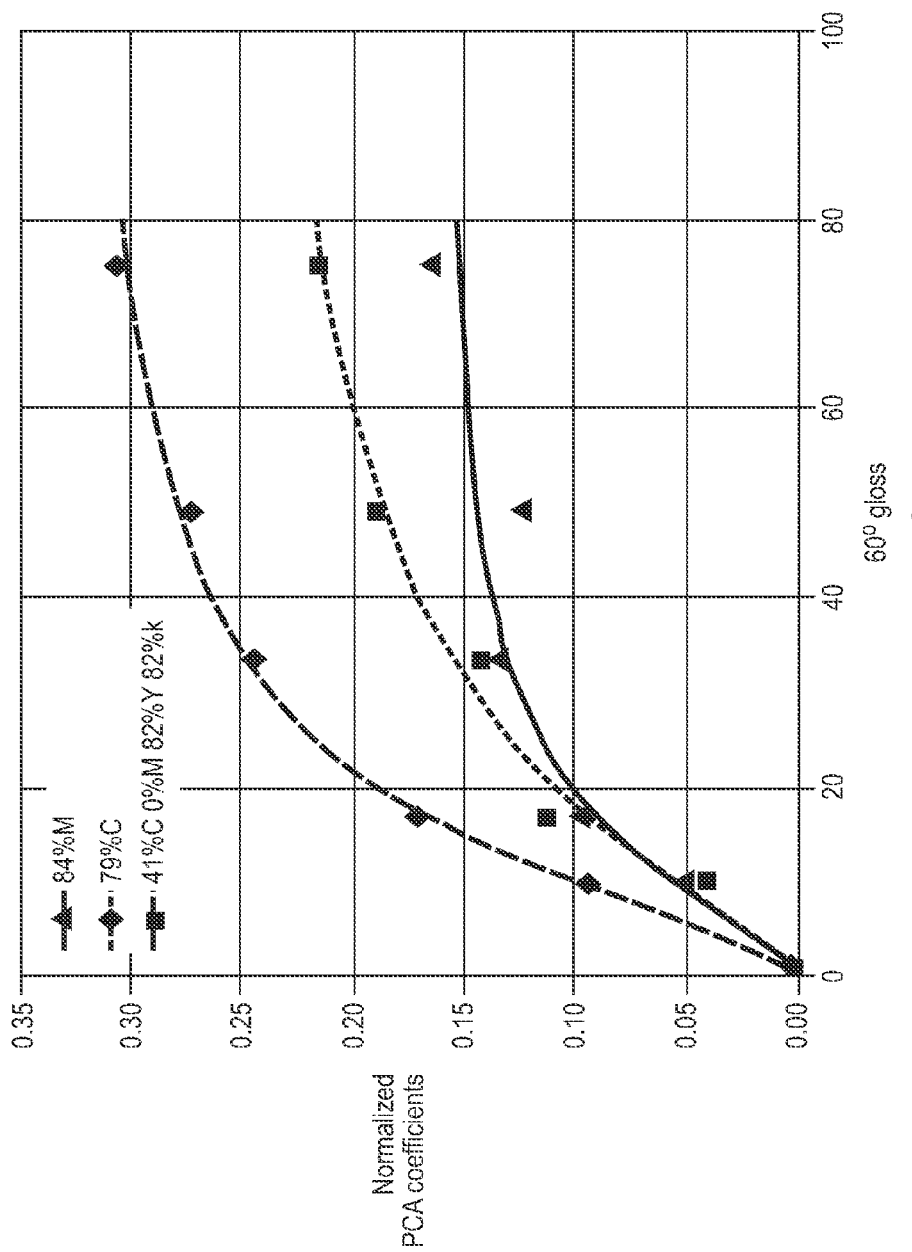
FIG. 7 is a graph of PCA coefficients verses gloss, illustrating aspects of embodiments herein.

FIGS. 5-7 illustrate further the reflectance modeling for variable gloss setting using a 2-basis (mean and first basis) PCA. Since there are 561 color patches printed on each of 5 substrates in this dataset, it is not practical to show all the data.

The Figures show the data for 3 selected color patches: 84% M; 79% C; and (41% C, 0% M, 82% Y, 82% K). FIGS. 5 and 6 are plots of the PCA basis vectors (mean and first basis vectors respectively) for the 3 selected colors.

FIG. 7 is a plot of the normalized PCA coefficients for the 3 selected colors as a function of 60° gloss. The symbols are the actual PCA coefficients, and the lines are the fitted asymptotic functions. This method has used the Logistic Dose Response function proposed in Dalal.

$$a(g) = L1 + \frac{L2}{\left[1 + \left(\frac{g}{L3}\right)^{L4}\right]}$$

where $a(g)$ is the PCA coefficient for the first basis at a gloss level g, and L1~L4 are the 4 parameters of the Logistic Dose Response function.

The printer may be re-profiled (i.e., the color profile of the printer may be updated) as is conventionally done whenever the printer drifts or otherwise changes its color output beyond a threshold value. The re-profiling operation will update the linear color value (reflectance spectrum, tristimulus values, etc.) at the nominal gloss condition. In one embodiment, which is the simplest approach, the parameters $a(g)$ or $r(g)$ may be considered to be invariant with time, regardless of color changes taking place in the printer. Hence, the parameters $a(g)$ or $r(g)$ may be pre-determined at the factory, or even pre-determined for the entire fleet of similar printers, and no further gloss characterization will be required to be done by the customer. In another embodiment, the customer can choose to re-profile a few extra gloss levels in addition to the nominal gloss condition as in the simplest method, where the data from the extra gloss levels are used to refine one or more of the model parameters L1 through L4 in the definition of $a(g)$ or $r(g)$.

Thus, as shown above, the time and effort involved in implementing the methods herein is significantly less than would be required in conventional methods. The embodiments herein take advantage of the fact that the effect of gloss on color is predictable, and can be modeled with only a few experimental parameters. Consequently, color profiles can be updated from color measurements under a small subset of gloss settings, thus providing an efficient way to color manage a printing system with selectable gloss capability.

Figure 8:
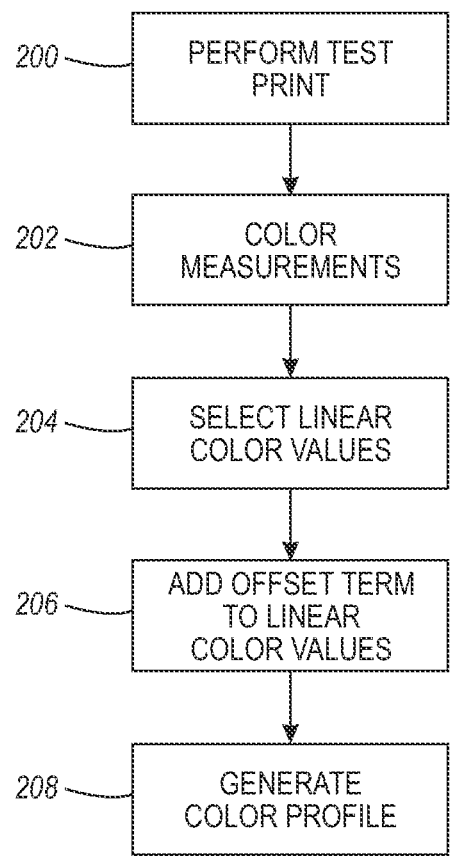
FIG. 8 is a flowchart, illustrating aspects of embodiments herein.

FIG. 8 is flowchart illustrating an exemplary method herein. In item 200, this method performs at least one test print at a nominal gloss condition. In item 202, the method performs color measurements on the test print to generate a color profile and/or to obtain linear color values.

This method selects at least one set of the linear color values at each gloss condition using at least one computerized device operatively (directly or indirectly) connected to the printing device in item 204. In a first embodiment, the linear color values selected correspond directly to the colors measured from the test print at each gloss condition. In a second embodiment, the linear color values selected comprise those obtained from color values corresponding to each node of a lookup table (LUT) which comprises the color profile at each gloss condition. In a colorimetric embodiment, the linear color values can comprise: tristimulus values XYZ; red, green, blue (RGB); or luminance component Y, and two chromatic components C1 and C2 (YCC) as detailed above. In a reflectance embodiment, the linear color values comprise reflectance spectra as detailed above.

In item 206, this exemplary method adds an offset term to each of the linear color values to produce a corresponding set of modified linear color values. The offset term comprises a function of the desired gloss condition. The function can be determined empirically or from first principles. For example, the function can be based on a Principal Component Analysis (PCA) of color data as a function of gloss condition.

Also, the offset term can comprise a function of the desired gloss condition and a corresponding color that corresponds to a linear color value. The corresponding color corresponds in terms of input colorant values (which can be, for example, in terms of cyan, magenta, yellow, and black (CMYK) values). The function can be based on a Principal Component Analysis (PCA) of color data as a function of gloss condition.

In item 208, the method generates a color profile for the printing device at the desired gloss condition. In the first embodiment, the color profile is generated using the modified linear color values in place of the measured linear color values. In the second embodiment, the color profile is generated by replacing the color values at each node of the LUT with those corresponding to the modified linear color values.

Figure 9:
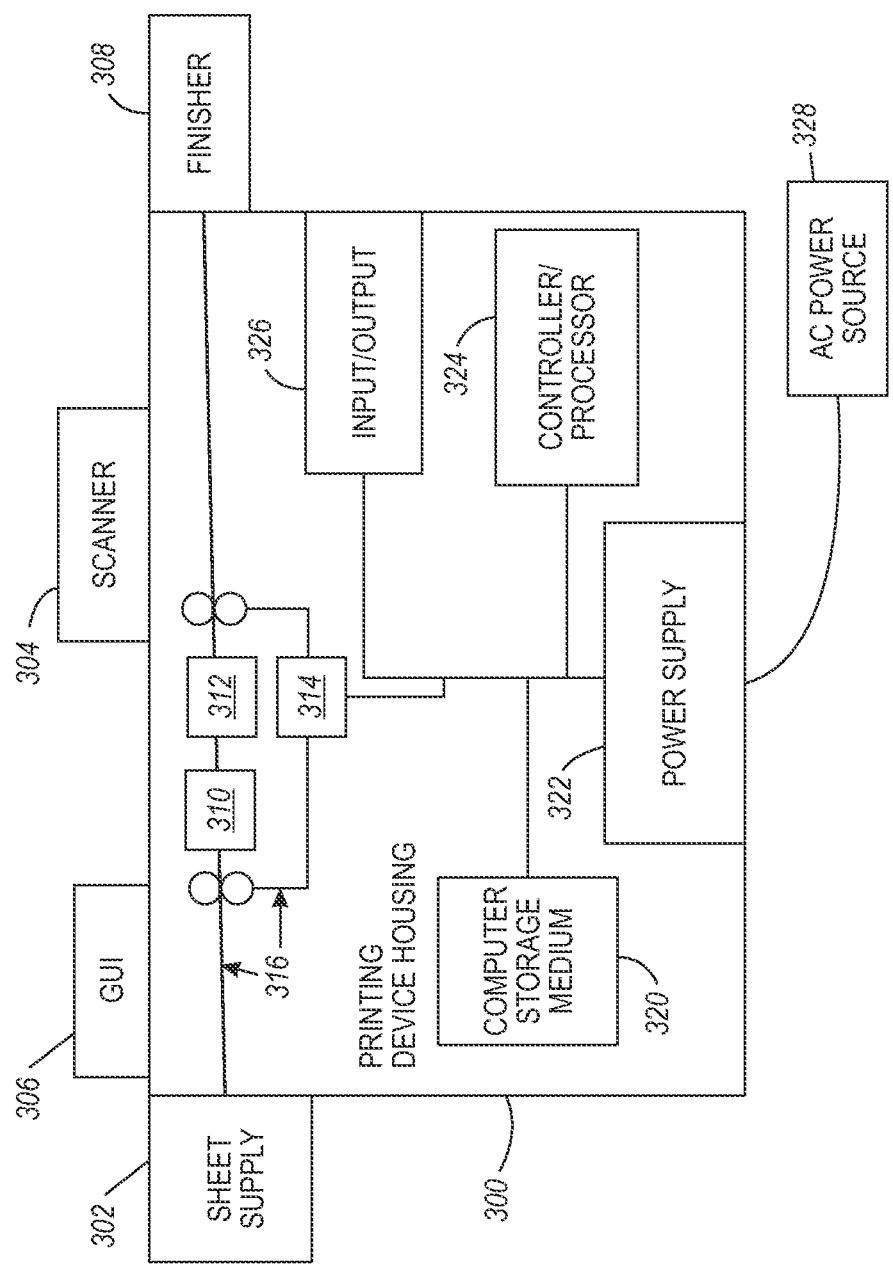
FIG. 9 is a schematic hardware diagram, illustrating aspects of embodiments herein.

FIG. 9 illustrates a computerized printing device 300, which can be used with embodiments herein and can comprise, for example, a printer, copier, multi-function machine, etc. The printing device 300 includes a controller/processor 324, at least one marking device (printing engines) 310, 312, 314 operatively connected to the processor 324, a media path 316 positioned to supply sheets of media from a sheet supply 302 to the marking device(s) 310, 312, 314, and a communications port (input/output) 326 operatively connected to the processor 324 and to a computerized network external to the printing device. Although the controller/processor 324 is shown as a single component, in practice it may consist of a number of discrete controllers which perform the traditional functions of the engine controller and the DFE, together with additional components for color measurement, profiling, and application of the gloss model. Moreover, two or more of these functions can be combined. After receiving various markings from the printing engine(s), the sheets of media can optionally pass to a finisher 308 which can fold, staple, sort, etc., the various printed sheets.

Also, the printing device 300 can include at least one accessory functional component (such as a scanner/document handler 304, sheet supply 302, finisher 308, etc.) and graphic user interface assembly 306 that also operate on the power supplied from the external power source 328 (through the power supply 322).

The input/output device 326 is used for communications to and from the multi-function printing device 300. The processor 324 controls the various actions of the printing device. A non-transitory computer storage medium device 320 (which can be optical, magnetic, capacitor based, etc.) is readable by the processor 324 and stores instructions that the processor 324 executes to allow the multi-function printing device to perform its various functions, such as those described herein.

Thus, a printer body housing 300 has one or more functional components that operate on power supplied from the alternating current (AC) 328 by the power supply 322. The power supply 322 connects to an external alternating current power source 328 and converts the external power into the type of power needed by the various components.

As would be understood by those ordinarily skilled in the art, the printing device 300 shown in FIG. 9 is only one example and the embodiments herein are equally applicable to other types of printing devices that may include fewer components or more components. For example, while a limited number of printing engines and paper paths are illustrated in FIG. 9, those ordinarily skilled in the art would understand that many more paper paths and additional printing engines could be included within any printing device used with embodiments herein.

In such a computerized (printing) device 300, the printing device 300 performs at least one test print at a nominal gloss condition to generate a color profile. This processor 324 performs color measurements on the test print to obtain linear color values.

This processor 324 selects at least one set of the linear color values corresponding to the color profile for the printing device (at the nominal gloss condition) using at least one computerized device operatively connected to (directly or indirectly connected to) the printing device. The linear color values selected comprise those obtained from color values corresponding to each node of the color profile at the nominal gloss condition.

In a colorimetric embodiment, the linear color values can comprise: tristimulus values XYZ; red, green, blue (RGB); or luminance component Y, and two chromatic components C1 and C2 (YCC). In a reflectance embodiment, the linear color values comprise reflectance spectra. The processor 324 adds an offset term to each of the linear color values to produce a corresponding set of modified linear color values, and generates a color profile for the printing device at the desired gloss condition based on the modified linear color values.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A computer-implemented method of generating a color profile for a printing device at any desired gloss condition that is achievable on said printing device, said method comprising:
    selecting at least one set of linear color values corresponding to a color profile for said printing device at a nominal gloss condition, using at least one computerized device operatively connected to said printing device;
    adding an offset term to each of said linear color values to produce a corresponding set of modified linear color values; and
    generating a color profile for said printing device at said desired gloss condition based on said modified linear color values.

2. The method of claim 1, wherein said linear color values selected comprise those obtained from color measurements on at least one test print used to generate said color profile at said nominal gloss condition.

3. The method of claim 1, wherein said linear color values selected comprise those obtained from color values corresponding to each node of said color profile at said nominal gloss condition.

4. The method of claim 1, wherein said offset term comprises a function of said desired gloss condition.

5. The method of claim 4, further comprising determining said function empirically.

6. The method of claim 5, wherein said determining of said function is based on a Principal Component Analysis (PCA) of color data as a function of gloss condition.

7. The method of claim 1, wherein said offset term comprises a function of said desired gloss condition and a corresponding color that corresponds to a linear color value.

8. The method of claim 7, wherein said corresponding color corresponds in terms of input colorant values.

9. The method of claim 8, wherein said input colorant values are in terms of cyan, magenta, yellow, and black (CMYK) values.

10. The method of claim 7, further comprising determining said function empirically.

11. The method of claim 10, wherein said determining of said function is based on a Principal Component Analysis (PCA) of color data as a function of gloss condition.

12. A computer-implemented method of generating a color profile for a printing device at any desired gloss condition that is achievable on said printing device, said method comprising:
    selecting at least one set of linear color values corresponding to a color profile for said printing device at a nominal gloss condition, using at least one computerized device operatively connected to said printing device, wherein said linear color values comprise one of: tristimulus values XYZ; red, green, blue (RGB); and luminance component Y, and two chromatic components C1 and C2 (YCC);
    adding an offset term to each of said linear color values to produce a corresponding set of modified linear color values; and
    generating a color profile for said printing device at said desired gloss condition based on said modified linear color values.

13. The method of claim 12, wherein said linear color values selected comprise those obtained from color measurements on at least one test print used to generate said color profile at said nominal gloss condition.

14. The method of claim 12, wherein said linear color values selected comprise those obtained from color values corresponding to each node of said color profile at said nominal gloss condition.

15. The method of claim 12, wherein said offset term comprises a function of said desired gloss condition.

16. The method of claim 15, further comprising determining said function empirically.

17. The method of claim 16, wherein said determining of said function is based on a Principal Component Analysis (PCA) of color data as a function of gloss condition.

18. A computer-implemented method of generating a color profile for a printing device at any desired gloss condition that is achievable on said printing device, said method comprising:
    selecting at least one set of linear color values corresponding to a color profile for said printing device at a nominal gloss condition, using at least one computerized device operatively connected to said printing device, wherein said linear color values comprise reflectance spectra;
    adding an offset term to each of said linear color values to produce a corresponding set of modified linear color values; and
    generating a color profile for said printing device at said desired gloss condition based on said modified linear color values.

19. The method of claim 18, wherein said linear color values selected comprise those obtained from color measurements on at least one test print used to generate said color profile at said nominal gloss condition.

20. The method of claim 18, wherein said linear color values selected comprise those obtained from color values corresponding to each node of said color profile at said nominal gloss condition.

21. The method of claim 18, wherein said offset term comprises a function of said desired gloss condition and a corresponding color that corresponds to a linear color value.

22. The method of claim 21, wherein said corresponding color corresponds in terms of input colorant values.

23. The method of claim 22, wherein said input colorant values are in terms of cyan, magenta, yellow, and black (CMYK) values.

24. The method of claim 21, further comprising determining said function empirically.

25. The method of claim 24, wherein said determining of said function is based on a Principal Component Analysis (PCA) of color data as a function of gloss condition.

26. A printing machine comprising:
    at least one processor; and
    at least one marking engine operatively connected to said processor, said marking engine having variable gloss capability,
    said processor performing a computer-implemented method of generating a color profile for a printing device at any desired gloss condition that is achievable on said printing device, said method comprising:

selecting at least one set of linear color values corresponding to a color profile for said printing device at a nominal gloss condition, using at least one computerized device operatively connected to said printing device;

adding an offset term to each of said linear color values to produce a corresponding set of modified linear color values; and generating a color profile for said printing device at said desired gloss condition based on said modified linear color values.

* * * * *